(12) United States Patent
Kamura et al.

(10) Patent No.: US 9,664,281 B2
(45) Date of Patent: May 30, 2017

(54) PISTON RING SPRAYED COATING, PISTON RING, AND METHOD FOR PRODUCING PISTON RING SPRAYED COATING

(71) Applicant: KABUSHIKI KAISHA RIKEN, Tokyo (JP)

(72) Inventors: Shuichi Kamura, Kashiwazaki (JP); Kazuhiko Hirota, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 14/651,221

(22) PCT Filed: Oct. 29, 2013

(86) PCT No.: PCT/JP2013/079286
§ 371 (c)(1),
(2) Date: Jun. 10, 2015

(87) PCT Pub. No.: WO2014/091831
PCT Pub. Date: Jun. 19, 2014

(65) Prior Publication Data
US 2015/0330507 A1    Nov. 19, 2015

(30) Foreign Application Priority Data

Dec. 11, 2012   (JP) .................................. 2012-270725

(51) Int. Cl.
*C22C 27/04*      (2006.01)
*C23C 4/06*       (2016.01)
(Continued)

(52) U.S. Cl.
CPC .................. *F16J 9/26* (2013.01); *C22C 27/04* (2013.01); *C22C 30/00* (2013.01); *C23C 4/06* (2013.01);
(Continued)

(58) Field of Classification Search
CPC ..... F16J 9/26; C23C 4/04; C23C 14/06; F02F 5/00; C22C 27/04; C22C 30/00
(Continued)

(56) References Cited

U.S. PATENT DOCUMENTS 3,556,747 A * 1/1971 Hyde et al. ............... C23C 4/06
427/292
3,749,559 A * 7/1973 Prasse ..................... B23P 15/08
277/442
(Continued)

FOREIGN PATENT DOCUMENTS

CN    1225152 A    8/1999
CN    1501986 A    6/2004
(Continued)

OTHER PUBLICATIONS

International preliminary report on patentability mailed Jun. 25, 2015, corresponding to International application No. PCT/JP2013/079286.

*Primary Examiner* — Kristina Fulton
*Assistant Examiner* — Eugene G Byrd
(74) *Attorney, Agent, or Firm* — Hauptman Ham, LLP

(57) ABSTRACT

A thermal spray coating for piston ring having excellent abrasion resistance, and capable of suppressing abrasion of the opposite member is provided. The thermal spray coating for piston ring according to the invention is a thermal spray coating for piston ring obtained by thermally spraying a powder composition on the outer peripheral sliding surface of a piston ring base material, and the powder composition contains molybdenum particles, nickel chromium alloy particles and chromium carbide particles, and the median diameter of the chromium carbide particles is 5 to 25 μm.

14 Claims, 3 Drawing Sheets

(51) Int. Cl.
*F16J 9/26* (2006.01)
*C22C 30/00* (2006.01)
*F02F 5/00* (2006.01)

(52) U.S. Cl.
CPC ......... *F02F 5/00* (2013.01); *Y10T 428/12389* (2015.01); *Y10T 428/12479* (2015.01)

(58) Field of Classification Search
USPC ........................................................ 277/442
See application file for complete search history.

(56) References Cited

U.S. PATENT DOCUMENTS

| | | | | |
|---|---|---|---|---|
| 5,763,106 | A * | 6/1998 | Blanchard ................. | C23C 4/04 419/10 |
| 9,394,598 | B2 * | 7/2016 | Sato .......................... | C23C 4/06 |
| 2011/0115167 | A1 * | 5/2011 | Linde ....................... | C25D 3/04 277/434 |
| 2011/0254230 | A1 * | 10/2011 | Jarosinski ............... | C22C 27/06 277/444 |
| 2014/0225330 | A1 * | 8/2014 | Saito ......................... | C23C 4/06 277/442 |

FOREIGN PATENT DOCUMENTS

| | | | |
|---|---|---|---|
| CN | 101715521 | A | 5/2010 |
| JP | 3-172681 | A | 7/1991 |
| JP | 2005-155711 | A | 6/2005 |
| JP | 2007-314839 | A | 12/2007 |
| JP | 2012-46821 | A | 3/2012 |
| JP | 2012-149765 | A | 8/2012 |

* cited by examiner

PISTON RING SPRAYED COATING, PISTON RING, AND METHOD FOR PRODUCING PISTON RING SPRAYED COATING

RELATED APPLICATIONS

The present application is a National Phase of International Application Number PCT/JP2013/079286, filed Oct. 29, 2013, and claims priority from, Japanese Application Number 2012-270725, filed Dec. 11, 2012.

TECHNICAL FIELD

The present invention relates to a thermal spray coating for piston ring, a piston ring, and a method for producing the thermal spray coating for piston ring.

BACKGROUND ART

In recent years, with the heightening of performance of engines such as increase in power, use environment of piston rings for engines has become severer, and piston rings having more excellent abrasion resistance and burning resistance have been demanded (refer to the following patent literatures 1 to 4). In particular, the outer peripheral surface of a piston ring which slides with a cylinder liner is required to have high abrasion resistance and burning resistance and the like. For responding to such requirements, high abrasion resistance and burning resistance have been imparted to piston rings by forming a coating on the outer peripheral sliding surfaces of piston rings by a thermal spraying method. Incidentally, "burning" is such a phenomenon that the outer peripheral surface of a piston ring (a sliding surface) is joined with the cylinder liner by heat generation due to sliding with the cylinder liner. "Burning resistance" is the property of resisting burning.

For example, as a method to heighten abrasion resistance of a thermal spray coating, a method of increasing a ceramic component contained in the thermal spray coating as hard particles has been taken.

CITATION LIST

Patent Literature

Patent Literature 1: Japanese Patent Laid-Open No. 2007-314839
Patent Literature 2: Japanese Patent Laid-Open No. 2005-155711
Patent Literature 3: Japanese Patent Laid-Open No. 2012-046821
Patent Literature 4: Japanese Patent Laid-Open No. 1991-172681

SUMMARY OF INVENTION

Technical Problem

However, there is such a problem that when the ceramic component in a thermal spray coating increases, abrasion loss of the inner surface of the engine liner which is sliding with the outer peripheral surface of a piston ring increases. A member which is sliding with the outer peripheral surface of a piston ring as the inner surface of the engine liner is hereinafter referred to as an "opposite member".

The objects of the present invention are to provide, a thermal spray coating having excellent abrasion resistance and capable of suppressing abrasion of the opposite member, a piston ring, and a method for producing the above thermal spray coating for piston ring.

Solution to Problems

One embodiment of the thermal spray coating for piston ring according to the invention is a thermal spray coating for piston ring which can be obtained by thermally spraying a powder composition on the outer peripheral sliding surface of a piston ring base material, and the powder composition contains molybdenum particles, nickel chromium alloy particles, and chromium carbide particles, and the median diameter of the chromium carbide particles is 5 to 25 μm.

In the above invention, the powder composition may be thermally sprayed on the outer peripheral sliding surface of the piston ring base material by a plasma spraying method.

The median diameter of the molybdenum particles may be 15 to 40 μm, and the median diameter of the nickel chromium alloy particles may be 10 to 35 μm.

The powder composition may contain 40 to 60% by mass of the molybdenum particles, and 20 to 40% by mass of the chromium carbide particles, each based on the total amount of the powder composition.

The porosity of the thermal spray coating may be 1 to 10% by area.

One embodiment of the piston ring according to the invention comprises a piston ring base material and the thermal spray coating for piston ring of the invention, the coating being formed on the outer peripheral sliding surface of the piston ring base material.

One embodiment of the method for producing a thermal spray coating for piston ring according to the invention comprises a step of thermally spraying a powder composition containing molybdenum particles, nickel chromium alloy particles, and chromium carbide particles on the outer peripheral sliding surface of a piston ring base material, and the median diameter of the chromium carbide particles is 5 to 25 μm.

In the above method for producing a thermal spray coating for piston ring, the powder composition may be thermally sprayed on the outer peripheral sliding surface of the piston ring base material by a plasma spraying method.

The above powder composition may contain 40 to 60% by mass of molybdenum particles, and 20 to 40% by mass of chromium carbide particles, each based on the total amount of the powder composition.

Advantageous Effects of Invention

The invention can provide a thermal spray coating for piston ring having excellent abrasion resistance and capable of suppressing abrasion of the opposite member, a piston ring, and a method for producing the above thermal spray coating for piston ring.

DESCRIPTION OF EMBODIMENTS

Preferred embodiments of the invention will be described in detail with reference to drawings, but the invention is not limited thereto.

Figure 1:
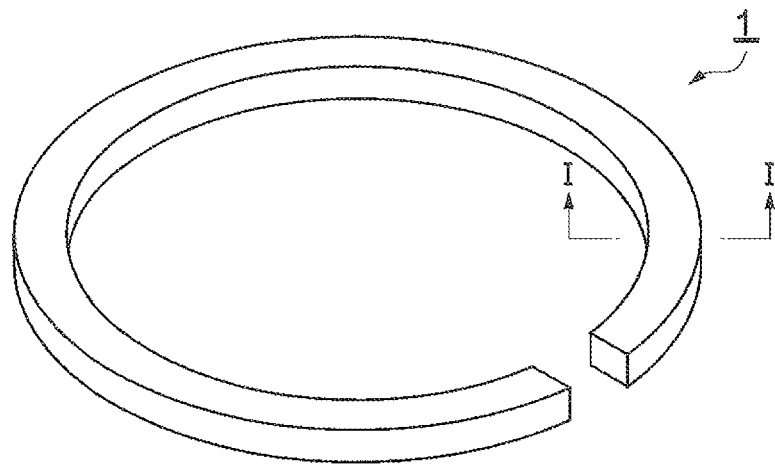
FIG. 1(a) is an oblique view showing a piston ring according to one embodiment of the invention.
FIG. 1(b) is a cross sectional view showing the piston ring in FIG. 1(a) in the 1-1 direction.
Figure 1:
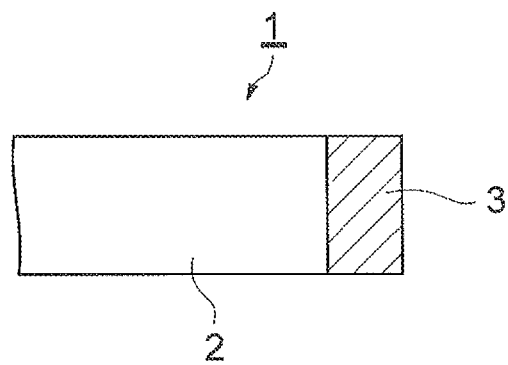

FIG. 1(a) is an oblique view showing a piston ring according to one embodiment of the invention, and FIG. 1(b) is a cross sectional view showing the piston ring in FIG. 1(a) in the 1-1 direction. The piston ring 1 in the embodiment of the invention comprises a piston ring base material 2, and a thermal spray coating 3 for piston ring formed on the outer peripheral sliding surface of the piston ring base material 2. The thermal spray coating 3 for piston ring is formed by thermally spraying the powder composition shown below on the outer peripheral sliding surface of the piston ring base material 2. Hereinafter, a thermal spray coating for piston ring is referred to as "a thermal spray coating".

(Powder Composition)

The above powder composition contains molybdenum particles, nickel chromium alloy particles, and chromium carbide particles. It is preferred that the powder composition comprises molybdenum particles, nickel chromium alloy particles, and chromium carbide particles alone.

The median diameter of the chromium carbide particles is 5 to 25 μm. The median diameter of the chromium carbide particles may be 9 to 24 μm, or may be 10 to 20 μm. When the median diameter of the chromium carbide particles is 5 μm or more, chromium carbide is liable to be entangled with other metal components in the thermal spray coating and is difficult to fall off the sliding surface of the thermal spray coating as compared with the case where the chromium carbide particles are too small. When the median diameter of the chromium carbide particles is 25 μm or less, it is difficult for the chromium carbide to protrude from the sliding surface and the sliding surface of the thermal spray coating becomes smooth, accordingly, chromium carbide itself is hard to fall off the sliding surface. Further, such a phenomenon that the sliding surface of the opposite member is abraded by the chromium carbide protruding on the sliding surface of the thermal spray coating is difficult to occur. When the median diameter of the chromium carbide particles is 25 μm or less, difference in hardness in the structure of the thermal spray coating reduces as compared with the case where the chromium carbide particles are too large. As a result, partially hard parts (the part where the chromium carbide is unevenly distributed) on the sliding surface of the thermal spray coating lessen, and a phenomenon such that minute unevenness is formed on the sliding surface of the opposite member by the chromium carbide is difficult to occur. For these reasons, the thermal spray coating for piston ring of the embodiment of the invention is not only excellent in abrasion resistance but also capable of suppressing abrasion of the sliding surface of the opposite member. Particle groups having a variety of particle sizes are classified into two groups of a larger particle diameter group and a smaller particle diameter group with a certain particle diameter as the boundary, and when the larger particle diameter group and the smaller particle diameter group are equivalent in number, the boundary particle diameter at that time is called a median diameter of the particles.

A powder composition may contain 40 to 60% by mass of molybdenum particles based on the total amount of the powder composition, or may contain 45 to 55% by mass. When molybdenum particles are contained in a powder composition, a thermal spray coating excellent in abrasion resistance and burning resistance, and also excellent in adhesion with the piston ring base material can be obtained. When the content of molybdenum particles in a powder composition is 40% by mass or more, the above burning resistance and adhesiveness are liable to sufficiently obtained. Further, when the content of molybdenum particles in a powder composition is 60% by mass or less, the contents of chromium carbide particles and nickel chromium alloy particles are adjusted and the mixing rate of chromium carbide particles and nickel chromium alloy particles is liable to be secured.

The median diameter of molybdenum particles may be 15 to 40 μm, or may be 25 to 35 μm. When the median diameter of molybdenum particles is 15 μm or more, molybdenum is easily entangled with other metal components in the thermal spray coating. Further, excessive generation of fume can be suppressed at the time of spraying, and adhesion of the thermal spray coating with the piston ring base material is liable to be improved. In addition, the flowability of the powder composition is improved and a thermal spray coating can be easily formed. On the other hand, when the median diameter of molybdenum particles is 40 μm or less, a finer structure is formed in the thermal spray coating and abrasion of the opposite member is liable to be reduced. Furthermore, melting at the time of thermal spraying becomes easy and the porosity in the thermal spray coating is liable to be reduced.

Molybdenum particles may be granulated and sintered particles. Granulated and sintered molybdenum particles are obtained by granulating molybdenum powder having a small diameter and then sintering by heating the granulated molybdenum particles. The particle diameter of molybdenum powder to be used for granulation is, e.g., 1 to 3 μm.

A powder composition may contain nickel chromium alloy particles in an amount of 10 to 25% by mass based on the total amount of the powder composition, or may be 10 to 20% by mass. By the presence of nickel chromium alloy particles in the powder composition, falling off of the chromium carbide from the thermal spray coating due to sliding etc. can be suppressed. When the content of nickel chromium alloy particles in a powder composition is 10% by mass or more, falling off of the components constituting the thermal spray coating, in particular, chromium carbide, is liable to be easily suppressed. Further, when the content of nickel chromium alloy particles in a powder composition is 25% by mass or less, burning resistance is liable to be improved.

The median diameter of nickel chromium alloy particles may be 10 to 35 μm, or may be 15 to 30 μm. When the median diameter of nickel chromium alloy particles is 15 μm or more, falling off of the components constituting the thermal spray coating, in particular, chromium carbide, is liable to be easily suppressed. Further, when the median diameter of nickel chromium alloy particles is 35 μm or less, the structure in the thermal spray coating becomes compact, falling off of the components constituting the thermal spray coating is liable to be easily suppressed, and abrasion of the opposite member is liable to be suppressed. In addition, the nickel chromium alloy in the thermal spray coating is finely dispersed on the sliding surface to thereby easily reduce abrasion of the opposite member.

A powder composition may contain 20 to 40% by mass of chromium carbide particles based on the total amount of the powder composition, or may contain 30 to 40% by mass. By the presence of chromium carbide particles in a powder composition, abrasion resistance of the thermal spray coating in an engine etc. can be improved. By containing 20% by mass or more of chromium carbide particles in the powder composition, the effect of abrasion resistance can be sufficiently obtained. Further, by containing 40% by mass or less of chromium carbide particles in the powder composition, binding between particles in the thermal spray coating becomes tenacious and falling off of the chromium carbide from the thermal spray coating surface can be suppressed. When chromium carbide falls off, since the piston ring and the opposite member are slid with each other with the fallen chromium carbide being present at the boundary of the thermal spray coating and the opposite member, abrasion losses of the coating and the opposite member are both liable to increase.

A powder composition may contain other components besides the above. Examples of other components include nickel alloy other than nickel chromium alloy, cobalt alloy, copper and copper alloy. The nickel alloy includes nickel base self-melting alloy. As the content of other components in the powder composition, the content of 1 to 10% by mass or so based on the total amount of the powder composition is sufficient. The median diameter of other components is not especially restricted. It is inevitable for the above powder composition to contain the components other than the above as impurities. It is sufficient that the content of the impurities is as low as it does not hinder the effect of the invention.

(Thermal Spraying)

A powder composition is heated within a thermal spraying apparatus and jetted onto the outer peripheral surface of a piston ring base material at a high velocity. Methods of thermally spraying a powder composition onto the outer peripheral surface of a piston ring base material include a gas flame spraying method, a plasma spraying method and a high velocity flame spraying method (HVOF), and a plasma spraying method is preferred.

In a plasma spraying method, by applying high voltage between the anode and the cathode of a thermal spraying apparatus, gas present between the anode and the cathode is converted into plasma. The gas converted into plasma is heated and for further expansion jetted from the thermal spraying apparatus at the high temperature and high velocity to become to a plasma jet stream. A powder composition supplied to the thermal spraying apparatus is heated in the plasma jet stream, accelerated, and jetted to a piston ring base material. Since a part of the heated and accelerated particles is melted, at the time of impinging on a piston ring base material, the particles are flattened and accumulated on the outer peripheral sliding surface of the piston ring base material in a stratified state. And the particles accumulated in a stratified state are quenched on the piston ring base material to thereby form a thermal spray coating.

A plasma spraying method can heat particles in the supplied powder composition at a higher temperature than other thermal spraying method, and melting of each particle in the powder composition is liable to be accelerated. Therefore, in the cross section vertical to the sliding surface (a cross section parallel to the thickness direction of the coating) of the thermal spray coating obtained by plasma spraying, such a structure is liable to be formed that accumulated molybdenum layer, nickel chromium alloy layer and chromium carbide layer lie one upon another while undulating like a wave(s) (bending repeatedly so as to form folds) and the layers get entangled with each other. Since such a structure is formed in the cross section of the thermal spray coating, chromium carbide is retained in the thermal spray coating after sliding, and the surface of the thermal spray coating after sliding shows a tendency to be smooth. Accordingly, the thermal spray coating obtained by the plasma spraying is excellent in abrasion resistance and capable of suppressing abrasion of the opposite member.

For obtaining thermal spray coating excellent in abrasion resistance and capable of suppressing abrasion of the opposite member, from the viewpoint of sufficiently converting the gas into plasma, it is sufficient that the current value of plasma spraying (plasma gas current) is 450 to 550 A, and the electric power value is 45 to 75 kW.

Examples of gases supplied to the space between the anode and the cathode in a plasma spraying apparatus include nitrogen, argon, hydrogen and helium. One of the above gases (a plasma working gas) may be used alone, or two the gases may be used in combination. A plasma working gas is preferably a mixed gas of nitrogen and argon.

It is sufficient for the supply amount of the above plasma working gas to be 80 to 160 NL/minute, or it may be 100 to 130 NL/min. When the plasma working gas is a mixed gas of nitrogen and argon, it is sufficient for the supply amount of nitrogen in the mixed gas to be 1 to 20 NL/min. The supply amount of argon in the mixed gas of 79 to 140 NL/min is sufficient. When the supply amount of the plasma working gas is higher than the above-described lower limit, since a sufficient velocity can be imparted to the particles at thermal spraying time, the thermal spray coating becomes compact and falling off of the particles from the thermal spray coating is liable to be suppressed. When the supply amount of the plasma working gas is lower than the above-described upper limit, the velocity of the particles at thermal spraying time does not become too great, and the thermal spray coating is liable to be suppressed from becoming excessively compact. Therefore, there is a tendency for the internal stress in the thermal spray coating to become small, and a crack is difficult to occur. Further, it becomes possible to sufficiently melt particles in the powder composition, containing a lump of particles not sufficiently melted (spitting) in the thermal spray coating is suppressed, and roughening of the surface of the thermal spray coating is liable to be suppressed.

The thickness of the thermal spray coating of 50 to 600 µm is sufficient, or may also be 200 to 450 µm. When the thickness of the thermal spray coating is 50 µm or more, even after processing the surface to control roughness of the thermal spray coating, a thermal spray coating having a sufficient thickness can be left and durability of the thermal spray coating is liable to be maintained. When the thickness of the thermal spray coating is 600 µm or less, peeling off of the thermal spray coating from the piston ring base material 2 is easily suppressed.

It is sufficient that the porosity of a thermal spray coating is 1 to 10% by area. It is sufficient for the porosity of a thermal spray coating to be 1 to 5% by area. The porosity of a thermal spray coating is the rate that the sum total of the area of the open parts of the pores in the cross section accounting for in the total area of the cross section of the thermal spray coating in the vertical direction to the base material surface (or the sliding surface of the thermal spray coating). When the porosity of a thermal spray coating is 10% by area or less, the thermal spray coating becomes compact and the increase in abrasion loss of the thermal spray coating and abrasion loss of the opposite member is liable to be suppressed. When the porosity of a thermal spray coating is 1% by area or more, burning is liable to be suppressed by oil retentive properties of the pore part.

(Piston Ring Base Material)

Piston ring base materials include, for example, cast iron products and steel products. The outer diameter of a piston ring base material is 200 mm to 980 mm, the inner diameter is 190 mm to 920 mm, and the thickness is 5 mm to 25 mm or so. When a piston ring is used in an engine etc., the outer peripheral surface of the piston ring base material is the surface which slides with the opposite member, such as a liner.

On the outer peripheral surface of a piston ring base material, asperity with roughness of 1 to 20 µm or so may be formed by sand blast and the like in advance before forming thermal spray coating 3. By forming asperity, when the particles melted by thermal spraying impinge against the convex parts or the concave parts of the piston ring base material, an anchoring effect by stress working to the particles attendant upon solidification and contraction of melted particles is generated, thereby adhesion of the thermal spray coating and the piston ring base material is liable to be strengthened.

EXAMPLES

The invention will be specifically described below with reference to Examples, but the invention is not limited thereto.

An abrasion resistance test of the piston rings for test obtained in Examples and Comparative Examples was performed according to the following method.

[Abrasion Resisting Test]

Figure 2:
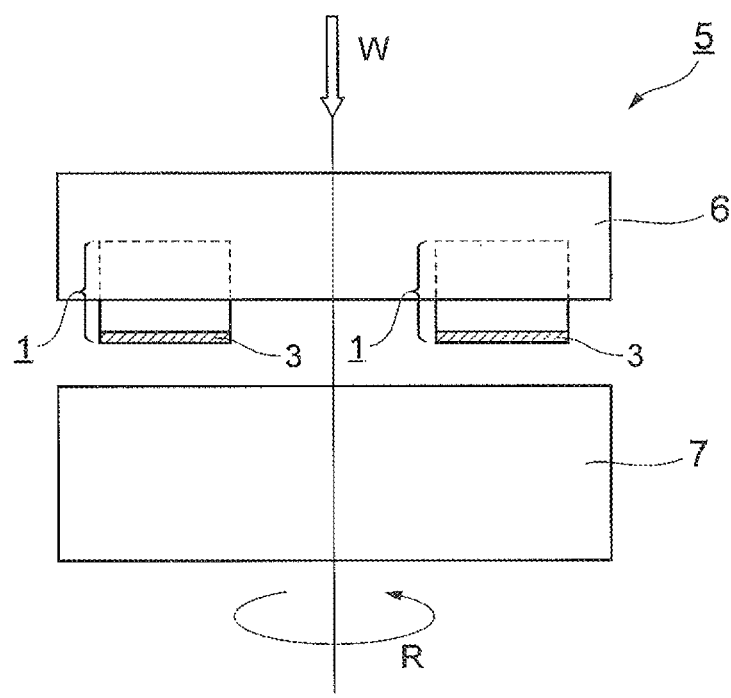
FIG. 2 is a side view showing an abrasion loss measuring apparatus.

FIG. 2 is a side view showing an abrasion loss measuring apparatus for use in the abrasion resisting test. In the abrasion loss measuring apparatus 5, holder 6 and disc 7 are arranged opposite to each other. And, two piston rings 1 for the test obtained in the later-described Examples or Comparative Examples were inserted onto holder 6 so that thermal spray coating 3 faced to the disc 7 side and they were fixed. Thermal spray coating 3 of piston ring 1 for the test and disc 7 were brought into contact by applying weight W from the holder 6 side to the disc 7 side. With maintaining the state of thermal spray coating 3 and disc 7 being in contact, while supplying a lubricating oil to the contact area, disc 7 was rotated in the direction of arrow R in FIG. 2 on the following condition. Rz in the following test condition means ten-point average roughness (JIS B0601-1982).

<Test Condition>
Disc rotating speed: 1.65 msec. (790 rpm)
Disc surface roughness: Rz=1.5 to 3.5 µm
Disc shape: outer diameter 60 mm, thickness 15 mm
Disc material: boron cast iron ("TARKALLOY", registered trade mark)
Disc temperature: about 180° C.
Contact area of one piston ring and the disc: 3.5 mm×5 mm
Contact pressure: 94 MPa
Lubricating oil: engine oil for large sized diesel engine SAE20
Temperature of lubricating oil: about 65° C. (at supplying time to the sliding surface
Oil supplying speed: 150 cc/min.
Weight W: 3300 N
Test time: 130 min. (running-in 5 min., real test 60 min., repeating two times)

The thickness of piston ring 1 for test (the total value of the thicknesses of the piston ring base material and the thermal spray coating) was measured with a micrometer before and after the abrasion resistance test. The abrasion loss of the thermal spray coating was computed by subtracting the thickness of piston ring 1 for test after abrasion resistance test from the thickness of piston ring 1 for test before abrasion resistance test.

Further, by using a cat's whisker probe type level difference meter, the distance (difference in level) between the bottom face of the sliding part (slid trace) on the surface of the disc after the abrasion resistance test and the surface of non-sliding part was measured, and the measured value was taken as the abrasion loss of the opposite member. Furthermore, a total abrasion loss and an abrasion ratio were computed. Here, the total abrasion loss means the sum total of the abrasion loss of the thermal spray coating and the abrasion loss of the opposite member (µm). The abrasion ratio is the ratio (%) of the total abrasion loss in each Example or Comparative Example, with the total abrasion loss in the later-described Comparative Example 1 being standard, which is found by the following equation.

Abrasion ratio (%)=(the total abrasion loss in each Example or Comparative Example)/(the total abrasion loss in Comparative Example 1)×100

Example 1

A plate of rolled steel for general structural purpose (SS400) was cut out to a prismatic shape of 5 mm in length, 3.5 mm in breadth, and 8 mm in height, thereby a piston ring base material for test was obtained. Formation of a thermal spray coating and abrasion resistance test etc. were carried out to the surface of 5 mm in length and 3.5 mm in breadth of the above piston ring base material. Hereinafter, the surface is sometimes referred to as an outer peripheral sliding surface.

A powder composition was prepared by mixing 50 parts by mass (50% by mass) of molybdenum particles, 15 parts by mass (15% by mass) of nickel chromium alloy particles, and 35 parts by mass (35% by mass) of chromium carbide particles. As the molybdenum particles, particles available from Paulex Co., Ltd. obtained by granulating and sintering molybdenum powder (trade name; SG-12S) was used. The particle diameter of the molybdenum powder before granulation (primary particles) was 1 to 3 µm and the median diameter of the molybdenum particles after granulation (secondary particles) was 31 µm. As the nickel chromium alloy particles, particles available from Sulzer Metco AG (trade name: Metco 43VF-NS) was used. The median diameter of the nickel chromium alloy particles was 22 µm. As the chromium carbide particles, particles available from Sulzer Metco AG (trade name: Metco 70F) was used. The median diameter of the chromium carbide particles was 13 µm.

The obtained powder composition was supplied to a plasma spraying apparatus (manufactured by Sulzer Metco AG, trade name: TriplexPro), and the powder composition was thermally sprayed onto the outer peripheral sliding surface of the above piston ring base material for the test, thereby a piston ring for the test in Example 1 was made. Plasma spraying was carried out on the following condition.

Current: 450 A
Electric power: 54 kW
Carrier gas: mixed gas of Ar and $N_2$
Flow rate of Ar gas: 100 NL/min.
Flow rate of $N_2$ gas: 2.2 NL/min.

On the outer peripheral sliding surface of the piston ring base material for the test after thermal spraying, a thermal spray coating in the thickness of 380 µm was formed.

Figure 3:
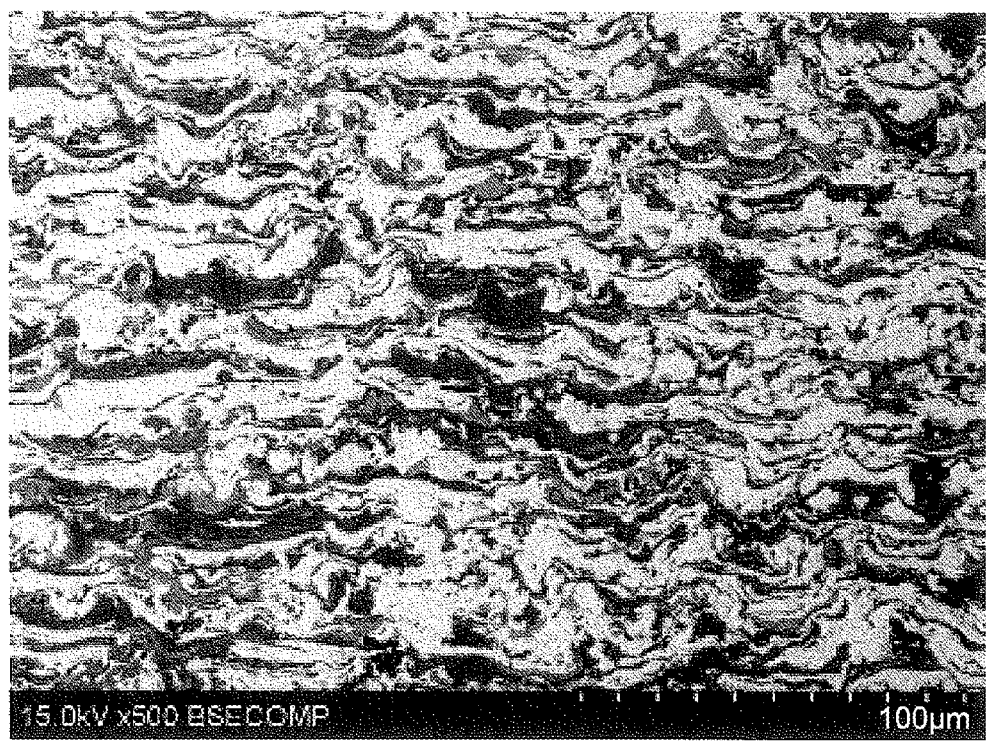
FIG. 3 is an image photographed with a scanning electron microscope showing the cross section vertical to the sliding surface of the thermal spray coating obtained in Example 1.

FIG. 3 is an image of the cross section vertical to the sliding surface of the thermal spray coating obtained photographed with a scanning electron microscope (SEM). A white part in FIG. 3 is molybdenum, a dark gray part is chromium carbide, a light gray part is a nickel chromium alloy, and a black part is a pore. From FIG. 3, it was seen that such a structure in which the molybdenum layer, the nickel chromium alloy layer and the chromium carbide layer lying one upon another while undulating like a wave (while bending repeatedly so as to form folds) and getting entangled with each other was formed.

The porosity in the thermal spray coating was small, it was 2.8% by area. In the image of the polished surface of the cross section of the thermal spray coating in the vertical direction to the base material surface, the pore part shown in black and other parts were binarized, and the porosity was found by computing the area percentage of the pore part. The polished surface of the cross section of the thermal spray coating was obtained by buffing using diamond abrasive grains of 1 μm. Further, the central part in the thickness direction of the cross section of the coating was measured at 20 points with a Vickers hardness meter (manufactured by Akashi Corporation, trade name: MVK-G2). The average value of hardness of the coating based on this measurement results was 625 Hv.

Examples 2 to 7 and Comparative Examples 1 to 3

A thermal spray coating and a piston ring in each Example and Comparative Example were obtained in the same manner as in Example 1 except for changing the formulation of the powder composition and median diameter of the particles constituting the powder composition as shown in Table 1 below. As the nickel base self-melting alloy in Example 6, particles available from Sulzer Metco AG (composition: Ni/17Cr/4Fe/4Si/3.5B/1C, trade name: Diamalloy2001) were used. "Parts by mass" in Table 1 is the same meaning with "% by mass" with the total amount of the powder composition as standard.

TABLE 1

| | Powder composition (parts by mass) | | | | Median Diameter (μm) | | | |
| --- | --- | --- | --- | --- | --- | --- | --- | --- |
| | Molybdenum Particles | Nickel Chromium Alloy Particles | Chromium Carbide Particles | Nickel Base Self-Melting Alloy | Molybdenum Particles | Nickel Chromium Alloy Particles | Chromium Carbide Particles | Nickel Base Self-Melting Alloy |
| Example 1 | 50 | 15 | 35 | — | 31 | 22 | 13 | — |
| Example 2 | 40 | 20 | 40 | — | 33 | 23 | 9 | — |
| Example 3 | 60 | 15 | 25 | — | 30 | 20 | 19 | — |
| Example 4 | 55 | 15 | 30 | — | 32 | 25 | 15 | — |
| Example 5 | 60 | 10 | 30 | — | 28 | 18 | 13 | — |
| Example 6 | 45 | 15 | 30 | 10 | 32 | 23 | 18 | 26 |
| Example 7 | 50 | 25 | 25 | — | 33 | 16 | 24 | — |
| Comparative Example 1 | 50 | 15 | 35 | — | 29 | 21 | 34 | — |
| Comparative Example 2 | 50 | 15 | 35 | — | 39 | 23 | 60 | — |
| Comparative Example 3 | 50 | 15 | 35 | — | 32 | 20 | 3 | — |

Porosity, hardness of coating (Vickers hardness), and abrasion loss of the thermal spray coating, abrasion loss of the opposite member, total abrasion loss, and abrasion ratio in the abrasion resisting test of each of the thermal spray coatings obtained in Examples 1 to 7 and Comparative Examples 1 to 3 are shown in Table 2 below.

TABLE 2

| | Porosity (% by area) | Hardness of Coating (Hv) | Loss of Thermal spray coating (μm) | Abrasion Loss of Opposite Member (μm) | Total Abrasion Loss (μm) | Abrasion Ratio (%) |
| --- | --- | --- | --- | --- | --- | --- |
| Example 1 | 2.8 | 625 | 37.0 | 17.9 | 54.9 | 55.2 |
| Example 2 | 2.3 | 685 | 35.4 | 25.1 | 60.5 | 60.8 |
| Example 3 | 2.8 | 608 | 48.6 | 18.5 | 67.1 | 67.4 |
| Example 4 | 3.3 | 628 | 45.3 | 19.2 | 64.5 | 64.8 |
| Example 5 | 4.1 | 641 | 43.8 | 22.1 | 65.9 | 66.2 |
| Example 6 | 1.5 | 672 | 46.6 | 23.4 | 70.0 | 70.4 |
| Example 7 | 1.6 | 665 | 39.6 | 20.2 | 59.8 | 60.1 |
| Comparative Example 1 | 3.1 | 709 | 58.2 | 41.3 | 99.5 | 100.0 |
| Comparative Example 2 | 3.5 | 751 | 178.5 | 275.8 | 454.3 | 456.6 |
| Comparative Example 3 | 2.5 | 582 | 85.2 | 31.9 | 117.1 | 117.7 |

As is apparent from Table 2, the thermal spray coatings in Examples 1 to 7 obtained from the powder compositions containing chromium carbide particles having a median diameter in the prescribed range showed that the abrasion loss was little and the abrasion loss of the opposite members was also little.

INDUSTRIAL APPLICABILITY

The thermal spray coating for piston ring and piston ring according to the invention are applied to, for example, piston rings for engines of automobiles and ships.

The invention claimed is:

1. A thermal spray coating for piston ring, the thermal spray coating being obtained by thermally spraying a powder composition on an outer peripheral sliding surface of a piston ring base material, wherein
   the powder composition contains molybdenum particles, nickel chromium alloy particles, and chromium carbide particles;
   a median diameter of the chromium carbide particles is 5 to 25 μm;
   the powder composition is thermally sprayed on the outer peripheral sliding surface of the piston ring base material by a plasma spraying method; and the thermal spray coating has a structure such that, from a perspective of a cross section vertical to the outer peripheral sliding surface of the thermal spray coating, the molybdenum layer, the nickel chromium alloy layer and the chromium carbide layer are layered upon one another in an undulating wave-like structure, and the layers are entangled with each other.

2. The thermal spray coating for piston ring according to claim 1, wherein
a median diameter of the molybdenum particles is 15 to 40 μm; and
a median diameter of the nickel chromium alloy particles is 10 to 35 μm.

3. The thermal spray coating for piston ring according to claim 1, wherein
the powder composition contains 40 to 60% by mass of the molybdenum particles, and 20 to 40% by mass of the chromium carbide particles, each based on the total amount of the powder composition.

4. The thermal spray coating for piston ring according to claim 1, wherein a porosity of the thermal spray coating for piston ring is 1 to 10% by area.

5. A piston ring comprising:
a piston ring base material; and
the thermal spray coating for piston ring according to claim 1, formed on the outer peripheral sliding surface of the piston ring base material.

6. The thermal spray coating for piston ring according to claim 1, wherein,
a porosity of the thermal spray coating for piston ring is 1.5 to 4.1% by area.

7. The thermal spray coating for piston ring according to claim 1, wherein,
Vickers hardness of the thermal spray coating for piston ring is 625 to 685 Hv.

8. A piston ring comprising:
a piston ring base material; and
the thermal spray coating for piston ring according to claim 1, formed on the outer peripheral sliding surface of the piston ring base material.

9. A piston ring comprising:
a piston ring base material; and
the thermal spray coating for piston ring according to claim 2, formed on the outer peripheral sliding surface of the piston ring base material.

10. A piston ring comprising:
a piston ring base material; and
the thermal spray coating for piston ring according to claim 3, formed on the outer peripheral sliding surface of the piston ring base material.

11. A piston ring comprising:
a piston ring base material; and
the thermal spray coating for piston ring according to claim 4, formed on the outer peripheral sliding surface of the piston ring base material.

12. A piston ring comprising:
a piston ring base material; and
the thermal spray coating for piston ring according to claim 1, formed on the outer peripheral sliding surface of the piston ring base material.

13. A piston ring comprising:
a piston ring base material; and
the thermal spray coating for piston ring according to claim 6, formed on the outer peripheral sliding surface of the piston ring base material.

14. A piston ring comprising:
a piston ring base material; and
the thermal spray coating for piston ring according to claim 7, formed on the outer peripheral sliding surface of the piston ring base material.

* * * * *